United States Patent
Petrucci et al.

(10) Patent No.: US 10,611,125 B2
(45) Date of Patent: Apr. 7, 2020

(54) METHOD FOR JOINING DISSIMILAR METALS AND ARTICLES COMPRISING THE SAME

(71) Applicant: GM GLOBAL TECHNOLOGY OPERATIONS LLC, Detroit, MI (US)

(72) Inventors: David R. Petrucci, Warren, MI (US); Robert N. Saje, Shelby Township, MI (US); William A. Schumacher, South Lyon, MI (US); Matthew P. Simonin, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 292 days.

(21) Appl. No.: 15/425,167

(22) Filed: Feb. 6, 2017

(65) Prior Publication Data
US 2018/0222150 A1 Aug. 9, 2018

(51) Int. Cl.
| | |
|---|---|
| *B32B 15/01* | (2006.01) |
| *B32B 3/26* | (2006.01) |
| *B32B 7/05* | (2019.01) |
| *B23K 35/00* | (2006.01) |
| *B23K 20/06* | (2006.01) |
| *B32B 3/04* | (2006.01) |
| *B32B 15/18* | (2006.01) |
| *B32B 15/20* | (2006.01) |
| *B23K 20/04* | (2006.01) |
| *B23K 11/11* | (2006.01) |
| *B23K 20/227* | (2006.01) |

(52) U.S. Cl.
CPC .......... *B32B 15/012* (2013.01); *B23K 11/115* (2013.01); *B23K 20/04* (2013.01); *B23K 20/06* (2013.01); *B23K 20/227* (2013.01); *B23K 35/001* (2013.01); *B32B 3/04* (2013.01); *B32B 3/266* (2013.01); *B32B 7/05* (2019.01); *B32B 15/18* (2013.01); *B32B 15/20* (2013.01); *B32B 2250/03* (2013.01); *B32B 2605/08* (2013.01); *B60Y 2304/00* (2013.01); *B60Y 2410/124* (2013.01)

(58) Field of Classification Search
None
See application file for complete search history.

(56) References Cited

U.S. PATENT DOCUMENTS

| | | | |
|---|---|---|---|
| 2009/0169918 A1* | 7/2009 | Haynes | ................. B32B 15/013 428/656 |
| 2013/0236739 A1* | 9/2013 | Yoshida | .................... C23C 2/02 428/653 |

(Continued)

FOREIGN PATENT DOCUMENTS

CN 101274387 A 10/2008

*Primary Examiner* — Adam Krupicka
(74) *Attorney, Agent, or Firm* — Cantor Colburn LLP (57) ABSTRACT

Disclosed herein is an article comprising a first metal layer; a second metal layer that is chemically different from the first metal layer; and a third metal layer disposed between the first metal layer and the second metal layer and contacting both the first metal layer and the second metal layer; where the third metal layer is chemically similar to either the first metal layer or the second metal layer; where at least two metal layers that are chemically similar are welded together through a clearance opening located in a metal layer that is not chemically similar to the at least two metal layers.

13 Claims, 8 Drawing Sheets

(56) References Cited

U.S. PATENT DOCUMENTS

2016/0221643 A1     8/2016  Smits
2016/0339966 A1    11/2016  Iwase et al.
2017/0095875 A1*    4/2017  Mizobata ............. B23K 9/0953

* cited by examiner

METHOD FOR JOINING DISSIMILAR METALS AND ARTICLES COMPRISING THE SAME

BACKGROUND

This disclosure relates to a method for joining dissimilar metals and to articles comprising the same.

Dissimilar metals are often in contact with one another in a variety of different devices, such as, for example, automobiles, aircraft, building frames, and the like. Design engineers are therefore increasingly faced with the need to join dissimilar materials as they are seeking creative new structures or parts with tailor-engineered properties. Sometimes a part needs high-temperature resistance in one area, good corrosion resistance in another, and so on. Structures may need toughness or wear resistance in one area combined with high strength in another location. Improving the ability to join dissimilar materials with engineered properties are enabling new approaches to light-weighting automotive structures, improving methods for energy production, creating next generation medical products and consumer devices, and many other manufacturing and industrial uses.

Joining dissimilar materials is often more difficult than joining the same material or alloys with minor differences in composition; however, many dissimilar materials can be joined successfully with the appropriate joining process and specialized procedures.

While it may be advantageous to use dissimilar metals in such devices to take advantage of properties such as lower weight, increased stiffness or elasticity, better electrical conductivity, and the like, galvanic corrosion often results because one metal often corrodes preferentially with respect to the other when both metals are in electrical contact.

Dissimilar metals and alloys have different electrode potentials, and when two or more come into contact in the presence of an electrolyte, one metal acts as anode and the other as cathode. The electro-potential difference between the dissimilar metals is the driving force for an accelerated attack on the anode member of the galvanic couple.

In automobiles, the problem of galvanic corrosion is often mitigated by disposing an electrically insulating layer of polymer adhesive between the dissimilar metals. The presence of the electrically insulating layer prevents galvanic corrosion and enables a variety of different dissimilar metals to be bonded together. The use of the electrically insulating layer while mitigating the effects of corrosion however, gives rise to other problems. One problem wrought by the adhesive bonding of these different metals is that it involves using a wide variety of different weld schedules. This produces a problem with the speed and efficiency of manufacturing automobiles. Another problem brought on by the problem of an electrically insulating layer between two electrically conducting layers of metal involves the reception of radio-frequency signals in the automobile.

It is therefore desirable to devise methods for manufacturing articles that comprise dissimilar metals by joining the metals in a manner that reduces the tendency towards galvanic corrosion, reduces weld schedules and improves radio frequency reception in automobiles.

SUMMARY

Disclosed herein is an article comprising a first metal layer; a second metal layer that is chemically different from the first metal layer; and a third metal layer disposed between the first metal layer and the second metal layer and contacting both the first metal layer and the second metal layer; where the third metal layer is chemically similar to either the first metal layer or the second metal layer; where at least two metal layers that are chemically similar are welded together through a clearance opening located in a metal layer that is not chemically similar to the at least two metal layers.

Disclosed herein too is an article comprising a laminate comprising a first metal layer; a second metal layer that is chemically different from the first metal layer and in contact with the first metal layer; and a third metal layer that is chemically similar to the second metal layer and in contact with the second metal layer; where a portion of the laminate is folded over to form a hem and where frictional contact between a hemmed portion of the first metal layer, the second metal layer and the third metal layer keeps the first metal layer, the second metal layer and the third metal layer in contact with each other.

Disclosed herein too is a method for manufacturing a metal joint comprising roll bonding a first metal layer to a second metal layer to form a first laminate; where the first metal layer and the second metal layer are chemically dissimilar metals; contacting the first laminate with a third metal layer that is similar in composition to the first metal layer or to the second metal layer; and welding the third metal layer to a metal layer in the first laminate that has a composition similar to a composition of the third metal layer via an opening in a metal layer that has a different composition from the composition of the third metal layer.

Disclosed herein too is a method for manufacturing a metal joint comprising contacting a first metal layer with a second metal layer, where the first metal layer is chemically different from the second metal layer; contacting the second metal layer with a third metal layer, where the second metal layer and the third metal layer have a similar chemical composition; and folding the first metal layer, the second metal layer and the third metal layer over to form a hem, where the second metal layer surrounds at least one surface of the first metal layer in the hem and where the third metal layer surrounds at least one surface of the second metal layer in the hem; and where frictional contact between a hemmed portion of the first metal layer, the second metal layer and the third metal layer keeps the first metal layer, the second metal layer and the third metal layer in contact with each other in the hem.

DETAILED DESCRIPTION

Disclosed herein are methods of joining dissimilar metals to form an inseparable laminate that reduces the rate of galvanic corrosion. The inseparable laminate is sometimes referred to herein as a joint. The method comprises contacting two dissimilar metal layers (a first metal layer and a second metal layer) via a third metal layer that is substantially chemically similar or chemically similar in composition to one of the two dissimilar metal layers. In an exemplary embodiment, the contact is a permanent contact and occurs via a bimetallic joining or bonding process such as, for example, roll bonding (also called cladding), magnetic pulse welding, or the like, after which the third metal layer is spot welded to either the first metal layer or the second metal layer through a clearance opening in either the first metal layer or the second metal layer.

It is to be noted that the use of the terms "first metal layer", "second metal layer", "third metal layer" and so on, do not represent an order in which the layers are brought into contact with each other in the laminate and also do not represent the location of the metal layers with respect to each other in the laminate. These terms are only a mechanism for identifying the layers and their positions relative to each other and this may change from figure to figure in this document.

It is also to be noted that spot welding may not be the only way to bond the layers of the laminate together. Other methods involving the use of conductive metals may be used in conjunction with or in lieu of spot welding. Other methods may include magnetic pulse welding. Other forms of welding may include resistance spot welding, by ultrasonic welding, projection welding, or the like. These are discussed in detail herein.

The term permanent joint or permanent contact as used herein refers to a long-lasting joint, where the respective metals are in constant metallic contact with each other. The metal joints disclosed herein are less susceptible to corrosion than other comparative joints.

In an embodiment, the location of the clearance opening in the first metal layer or in the second metal layer depends upon the composition of the third metal layer. If the third metal layer is substantially chemically similar or is chemically similar to the first metal layer, then the clearance opening is present in the second metal layer while if the third metal layer is substantially chemically similar or chemically similar to the second metal layer, then the clearance opening is present in the first metal layer.

By "substantially chemically similar" it is meant that two metal layers each contain at least 50 percent by weight (wt %), preferably at least 60 wt %, preferably at least 70 wt %, preferably at least 80 wt %, and more preferably at least 90 wt % of the same base metal, based on the total weight of the metal layer. The base metal may be an element (e.g., iron, copper, aluminum, and the like) or may be an alloy (e.g., steel, brass, and the like).

For example, two different stainless steels each having at least 50 wt % of iron would be considered to be substantially chemically similar. Examples of dissimilar steels that may be bonded together are High Strength Low Alloy (HSLA) 340 and Dual Phase 800. Examples of dissimilar aluminums that may be bonded together are Aluminum 6063-T6 and Aluminum 7075.

In yet another embodiment, the constant contact between the first metal layer and the second metal layer is brought about by forming a hem. The hem occurs via a fold over of a portion of the laminate. In this method, the first metal layer, the second metal layer and/or a third metal layer are first brought into contact with each other and then folded over to form a hem. The hemmed metal laminate may contain at least two dissimilar metal layers or at least three dissimilar metal layers. The respective metal layers in the laminate contact their adjoining metal layers with a frictional force effective to form a constant contact (i.e., long-lasting contact) between the two or more dissimilar metal layers, which prevents galvanic corrosion.

Figure 1A:
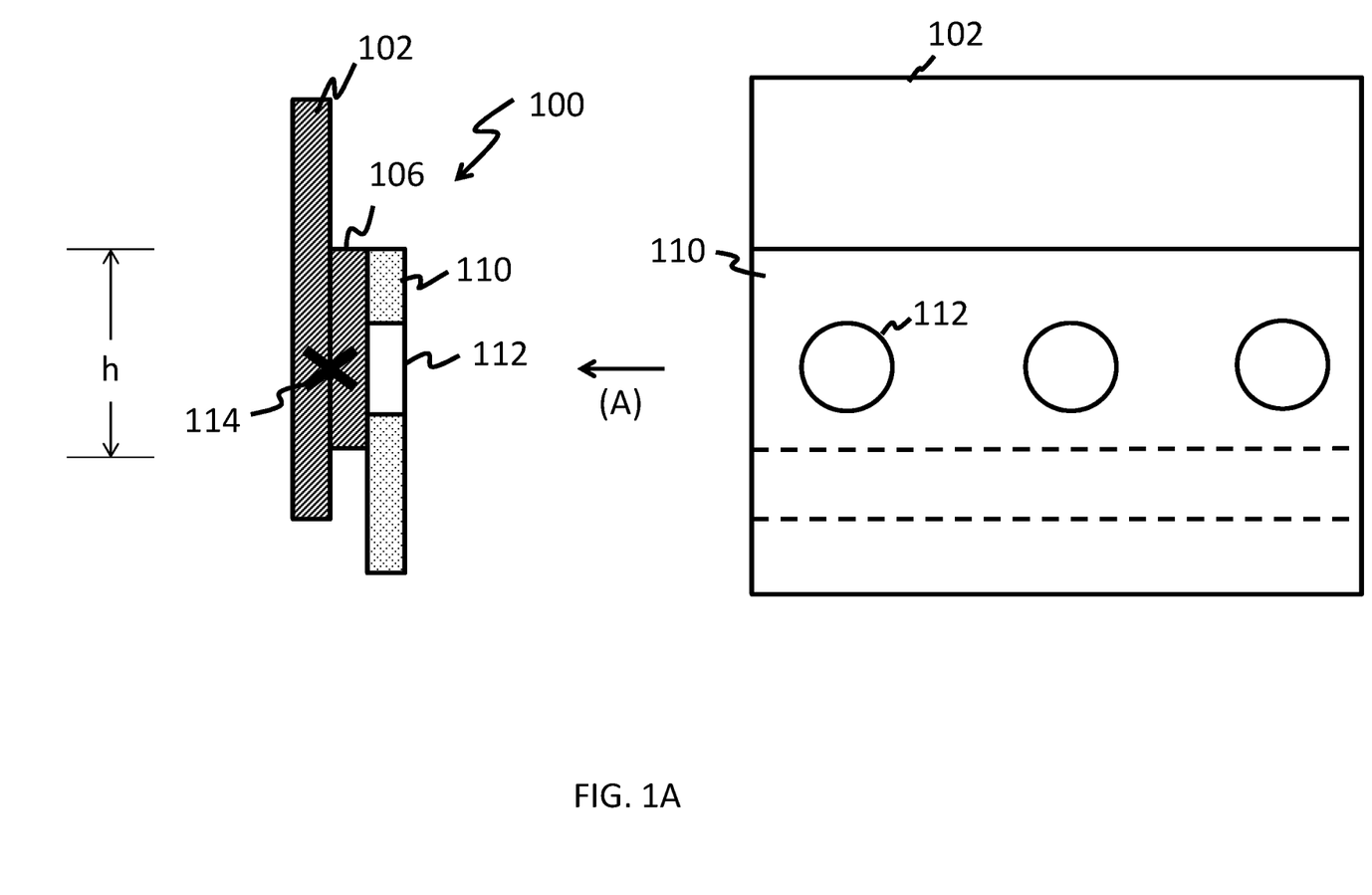
FIG. 1A is a schematic diagram of an article that comprises two dissimilar metals that are subjected to a bimetallic joining process and spot welded together to form a joint.
Figure 1B:
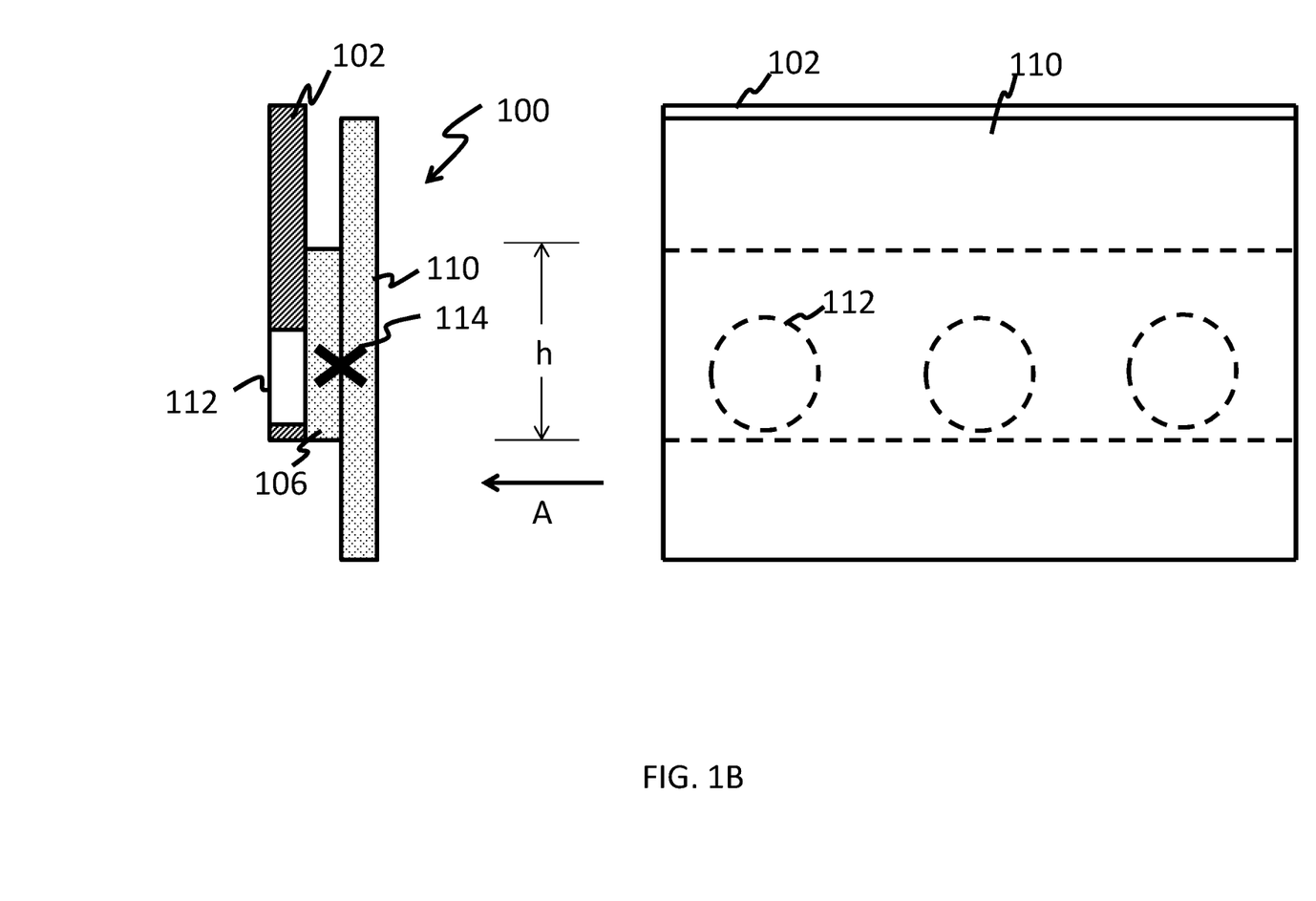
FIG. 1B is another schematic diagram of an article that comprises two dissimilar metals that are subjected to a bimetallic joining process and spot welded together to form a joint.

FIGS. 1A and 1B are schematic diagrams of an article 100 (e.g., a laminate) that comprises two dissimilar metal layers that are subjected to a bimetallic joining process and spot welded together to form a joint. With reference to the FIG. 1A, the first metal layer 106 is first roll bonded or bonded via magnetic pulse welding to a second metal layer 110 that comprises a different metal from the metal of the first metal layer 106. A third metal layer 102 (having a similar composition as the metal of the first metal layer 106) is then spot welded 114 to the first metal layer 106 via a clearance opening 112 present in the second metal layer 110.

FIG. 1A depicts two views—a cross-sectional view at the spot weld point (see figure on left) and a side view (see figure on right) taken in the direction "A" (indicated by the arrow) and depicts the situation where the third metal layer 102 is chemically similar to the first metal layer 106, while the FIG. 1B (which also depicts two views—a cross-sectional view at the spot weld point (see figure on the left) and a side view taken (see figure on the right) in the direction "A" (see arrow)) depicts the situation where the first metal layer 106 is chemically similar to the second metal layer 110. In the FIG. 1A, an opening 112 contained in the second metal layer 110 permits the first metal layer 106 to be spot welded with a spot weld 114 to the third metal layer 102. As may be seen in the side view in the FIG. 1A, a plurality of holes contained in the second metal layer 110 may be used to spot weld the third metal layer 102 to the first metal layer 106. It is to be noted that spot welding may not be the only way to bond the layers of the laminate together. Magnetic pulse welding (bonding) may also be used to form a contact between the third metal layer 102 and the first metal layer 106.

In the FIG. 1B, an opening 112 contained in the third metal layer 102 permits the second metal layer 110 to be spot welded with a spot weld 114 to the first metal layer 106. In the FIG. 1B (as in the FIG. 1A), the dissimilar metal layers are first cladded together followed by spot welding metal layers that have similar chemical compositions together through a clearance opening present in the dissimilar metal layer. The method of manufacturing the laminates is discussed in detail herein. The first metal layer 106 is sometimes referred to as a cheater strip. As may be seen in the side view in the FIG. 1B, a plurality of holes contained in the third metal layer 102 may be used to spot weld the first metal layer 106 to the second metal layer 110.

In short, from the aforementioned description of the FIGS. 1A and 1B, it may be seen that the spot weld generally occurs between similar metals (metals having the same chemical composition or substantially the same chemical composition) in the laminate, while the clearance opening is always present in the metal layer of the laminate that has a different composition from the metal layers that have the same composition. Dissimilar metals are clad bonded together prior to the spot welding of similar metals.

The first metal layer, the second metal layer and the third metal layer of the FIGS. 1A and 1B are transition metals or alloys of transition metals. In an embodiment, the metals (used in similar metal layers and dissimilar metal layers) are selected from the group consisting of titanium, iron, chromium, manganese, nickel, copper, zinc, zirconium, molybdenum, silver, gold, palladium, platinum, tantalum, tungsten, aluminum, and the like, and a combination thereof. In an embodiment, the metals may comprise alloys and are selected from the group consisting stainless steel, carbon steel, mild steel, brass, bronze, aluminum alloys, and the like, and a combination thereof.

The dissimilar metals used in the bonding laminate are preferably steel (e.g., stainless steel) and aluminum. In an embodiment (with reference to the FIGS. 1A and 1B), the third metal layer comprises steel while the first metal layer and the second metal layer each comprise aluminum. In another embodiment, the third metal layer comprises aluminum while the first metal layer and the second metal layer each comprise steel.

In another embodiment, the third metal layer comprises stainless steel while the first metal layer and the second metal layer each comprise aluminum. In another embodiment, the third metal layer comprises aluminum while the first metal layer and the second metal layer each comprise stainless steel.

In an embodiment, the first metal layer 106 has a thickness of 100 micrometers to 10 millimeters, preferably 1000 micrometers to 4 millimeters.

In an embodiment, the second metal 110 layer has a thickness of 500 micrometers to 5 millimeters, preferably 1000 micrometers to 2 millimeters.

In an embodiment, the third metal layer 102 has a thickness of 500 micrometers to 5 millimeters, preferably 1000 micrometers to 2 millimeters.

The thickness ratio of the first metal layer to the second metal layer can range from 1:10 to 10:1, preferably 1:5 to 5:1. The thickness ratio of the second metal layer to the third metal layer can range from 1:10 to 10:1, preferably 1:5 to 5:1. The thickness ratio of the first metal layer to the third metal layer can range from 1:10 to 10:1, preferably 1:5 to 5:1.

As can be seen in the FIG. 1A, the height "h" of the first metal layer 106 is generally equal to the amount of overlap between the first metal layer 106 and the second metal layer 110. The height "h" has a value of 5 to 15 millimeters. In the FIG. 1B, the height "h" of the first metal layer 106 is generally equal to the amount of overlap between the first metal layer 106 and the third metal layer 102. The height "h" has a value of 5 to 15 millimeters.

The clearance opening is generally disposed in the metal layer that is different in chemical composition from the two metal layers having the same chemical composition and that are to be spot welded to each other. The clearance opening is generally of a sufficient size to permit a spot welding tool to contact the third metal layer to facilitate its bonding (e.g., via melting) to the second metal layer. The clearance holes are generally present in the metal layer prior to the bimetallic joining process although it is possible to manufacture the clearance holes after the bimetallic joining process. The clearance holes may be spaced apart at various distances depending upon the point of application. The spacing between clearance holes may be periodic or aperiodic. A minimum concentration of spot welds is often used to eliminate "shunting", a high concentration of spot welds can be used in high stress areas, while a very wide spacing between spot welds may be used in low stress areas.

In an exemplary embodiment, the clearance holes may be spaced apart from 50 to 500 millimeters. In another exemplary embodiment, the clearance holes are manufactured prior to the bimetallic joining operation.

The spot weld may be brought about by resistance spot welding, by ultrasonic welding, projection welding, or a combination thereof. Resistance spot welding is a process in which contacting metal surfaces are joined by the heat obtained from resistance to electric current. Ultrasonic welding is a welding technique whereby high-frequency ultrasonic acoustic vibrations are locally applied to the metal layers to create a solid-state weld. Projection welding is a modification of spot welding. In this process, the weld is localized by means of raised sections, or projections, on one or both of the workpieces to be joined. Heat is concentrated at the projections, which permits the welding of heavier sections or the closer spacing of welds.

In one method of forming the laminate of the FIGS. 1A and 1B, the first and the third metal layers (the dissimilar metal layers) are subjected to a bimetallic joining or bonding process such as, for example, roll bonding (also called cladding), magnetic pulse welding, or a combination thereof to form a first laminate. This is done prior to the spot welding process. The second metal layer is then disposed on the first laminate on a surface of the first metal layer that is opposed to the surface that contact the third metal layer and the spot weld is formed between the metal layers that contain similar metals. The three layer laminate with the spot weld is herein referred to herein as the second laminate. In an embodiment, a series of spot welds may be formed between the first metal layer and the second metal layer (as depicted in the side views of the FIGS. 1A and 1B) to form the second laminate.

In an embodiment, the roll bonding (cladding) is conducted in a roll mill to form the first laminate. In an exemplary embodiment, the cladding is conducted in a cladding roll mill. Cladding roll mills are used to combine dissimilar metals into a single strip through compression and diffusion annealing. Following the formation of the first laminate, the welding process takes place to form the desired article (e.g., the second laminate).

Magnetic pulse welding (also known as electromagnetic forming (EM forming or magneforming) is a type of high velocity, cold forming process for electrically conductive metals. The workpiece is reshaped by high intensity pulsed magnetic fields that induce a current in the workpiece and a corresponding repulsive magnetic field, rapidly repelling portions of the workpiece. The workpiece can be reshaped without any contact from a tool, although in some instances the piece may be pressed against a die or former. The technique is sometimes called high velocity forming or electromagnetic pulse technology.

Figure 2A:
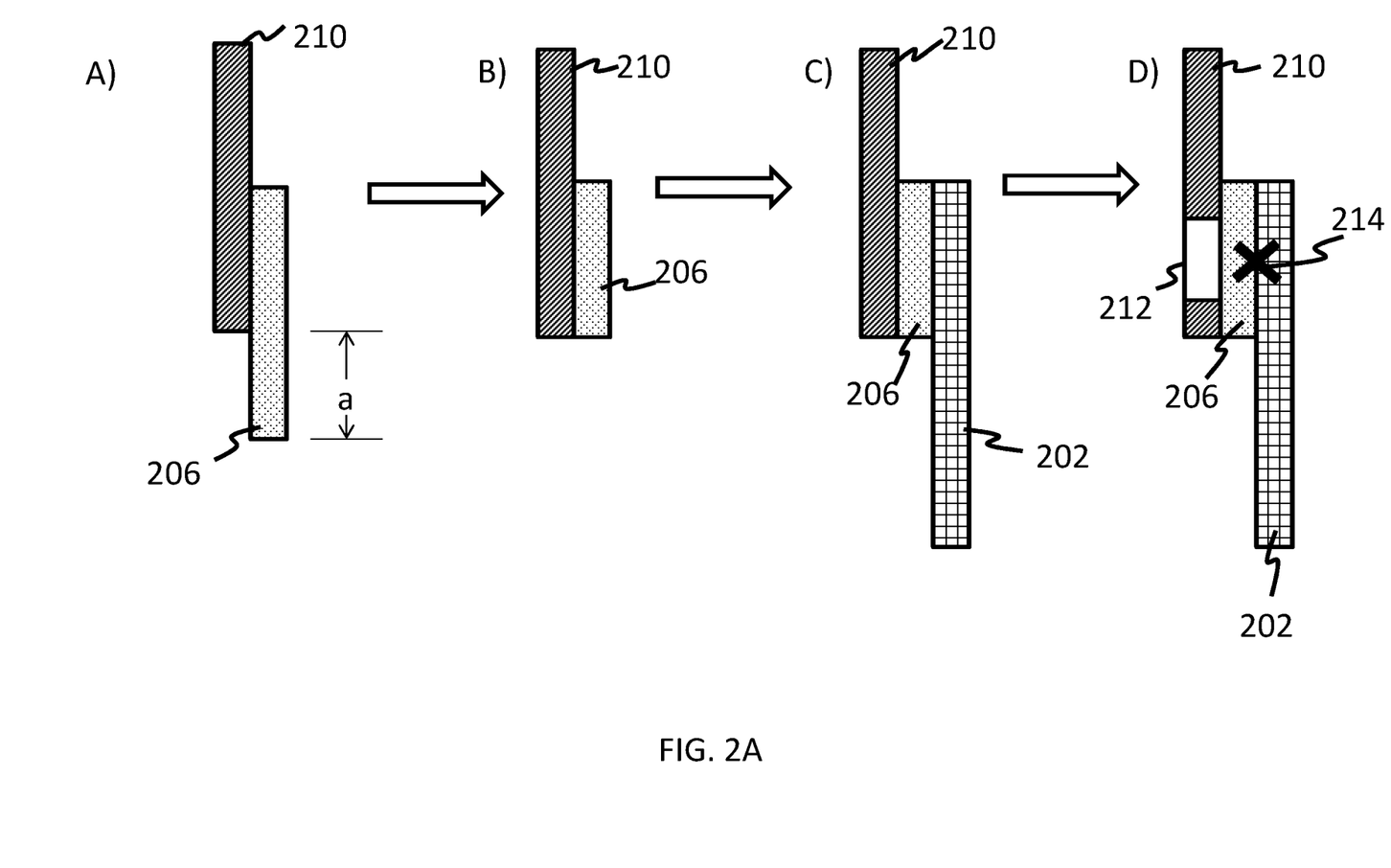
FIG. 2A is a schematic diagram that depicts a series of steps to manufacture an article that comprises three dissimilar metals.

The FIG. 2A depicts another exemplary embodiment where three dissimilar metals that are cladded and spot welded together, except that the two metals that are spot welded (or magnetically pulse bonded) together are substantially chemically similar (i.e., they have a large amount of a common base metal). In this embodiment, the first metal layer 206 is cladded to the second metal layer 210 to form a two layer first laminate (See Step A). Any flashing or overlap (also known as excess material) depicted by the letter "a" may be removed using any suitable technique (See Step B). The second metal layer 210 has a plurality of clearance holes 212 drilled in it that are used to spot weld the third metal layer 202 to the first metal layer 206 by a spot weld 214 to form the second laminate (See Step C and D). The first metal layer 206 and the third metal layer 202 have substantially similar chemical compositions. In an embodiment, the first metal layer 206 and the third metal layer 202 are both steel layers but contain different types of steel. For example, the first metal layer 206 may comprise stainless steel, while the third metal layer 202 may comprise carbon steel. In an embodiment, the second metal layer 210 comprises aluminum.

Figure 2B:
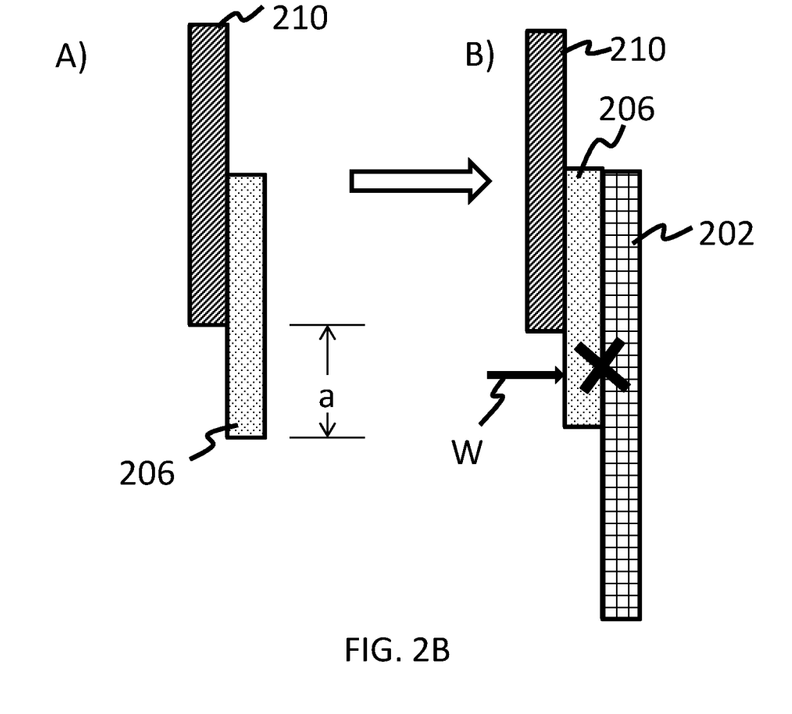
FIG. 2B is another schematic diagram that depicts a series of steps to manufacture an article that comprises three dissimilar metals.

In another embodiment, depicted in the FIG. 2B, three substantially dissimilar metals may be spot welded or magnetically pulse bonded to form a corrosion resistant article. The FIG. 2B like the FIG. 2A depicts another embodiment where three dissimilar metals that are cladded and spot welded together, except that the two metals that are spot welded (or magnetically pulse bonded) together are substantially chemically similar (i.e., they have a common base metal). The first metal layer 206 in the FIG. 2B is cladded to the second metal layer 210 to form a two layer first laminate (See Step A). In this embodiment, the excess material depicted by the letter "a" in the first metal layer 206 is not removed but is instead used as a location to form a spot weld 214 with the third metal layer 202. In this embodiment, no clearance opening is formed in the second metal layer 210. The first metal layer 206 is directly spot welded (depicted by the letter "W") to the third metal layer 202. The spot welds 214 in the FIGS. 2A and 2B may be replaced by magnetic pulse bonding or combined with magnetic pulse bonding.

In yet another embodiment, the laminate may contain four metal layers formed with two or more spot welds located in a single plane (in this case, the plane of the paper). In an exemplary embodiment, the laminate may contain four metal layers formed with two or more welds at a single cross-sectional location. This is depicted in the FIG. 3. The FIG. 3 represents a combination of the FIG. 1A and FIG. 1B.

Figure 3:
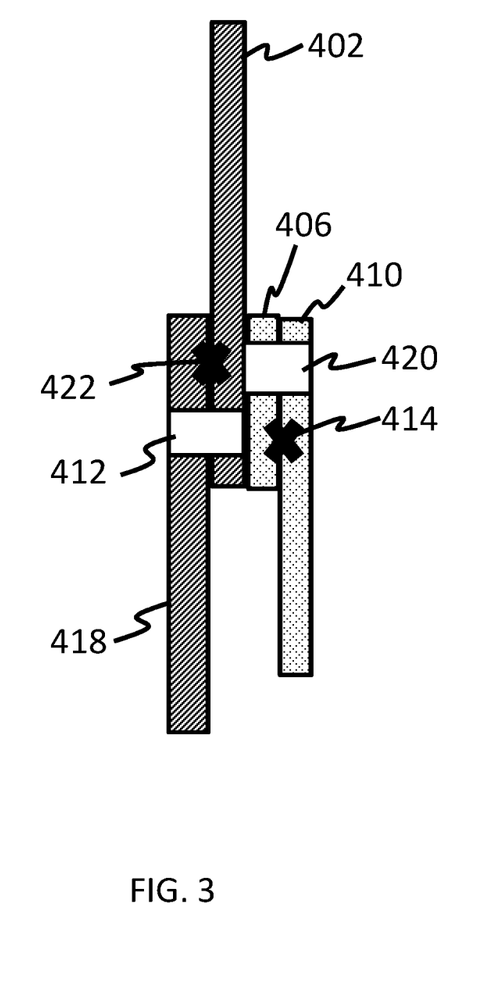
FIG. 3 is a schematic diagram of an article that comprises 4 metal layers having two or more dissimilar metals.

In the FIG. 3, a first metal layer 402 contacts a second metal layer 410 via a third metal layer 406 as seen previously in the FIG. 1B and a fourth metal layer 418 contacts the first metal layer 402 in a configuration similar to that of FIG. 1A. A first clearance opening 420 permits the welding of the first metal layer 402 with the fourth metal layer 418 via spot weld 422, while a second clearance opening 412 permits the welding of the second metal layer 410 with the third metal layer 406 via spot weld 414. The spot welds in the FIG. 3 may be replaced by magnetic pulse welding.

In the method of forming the joint of FIG. 3, dissimilar metal layers 402 and 406 are first roll bonded together. Metal layer 418 (having a similar composition to metal layer 402) is then spot welded to metal layer 402 via a clearance opening 420 in metal layer 406. Metal layer 410 is then spot welded to layer 406 via a clearance opening 412 in metal layers 402 and 418.

Figure 4A:
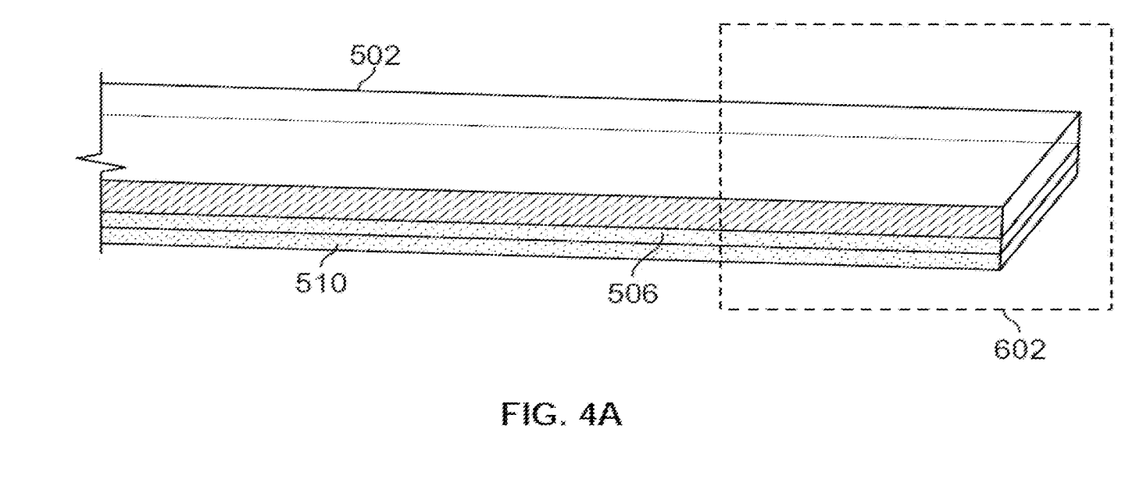
FIG. 4A depicts a method for manufacturing a hem from a portion of a dissimilar metal laminate to form a joint.
Figure 4B:
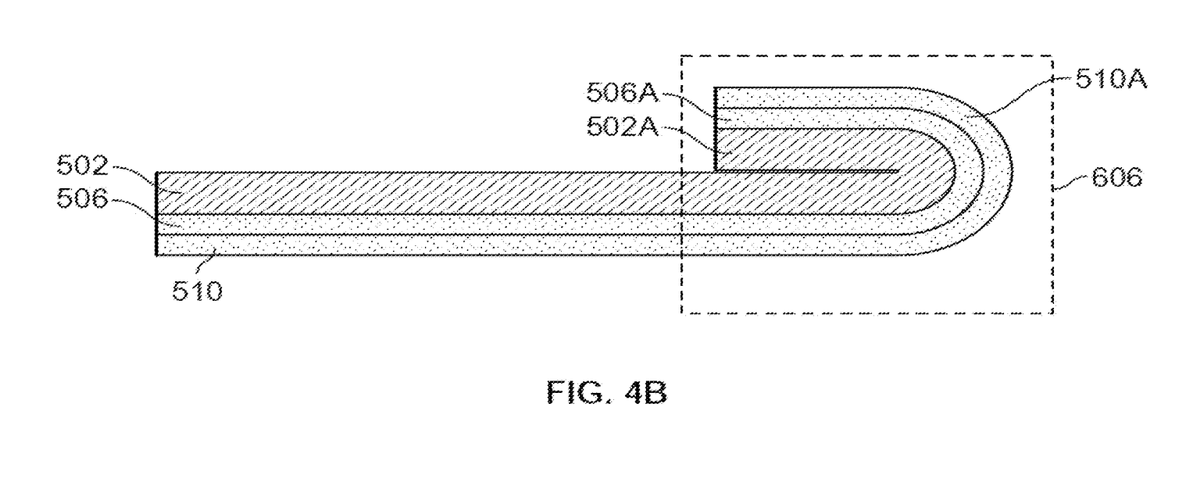
FIG. 4B further depicts a method for manufacturing a hem from a portion of the dissimilar metal laminate of the FIG. 4A to form a joint.

As noted above, a portion of the dissimilar metal laminate may be hemmed (folded over) to form a joint. This is depicted in the FIGS. 4A and 4B. FIG. 4A depicts a three layer laminate comprising a first metal layer 506, a second metal layer 510 and a third metal layer 502 having an end portion 602 that is bent over to form a hem 606 as depicted in the FIG. 4B. Because of the hem 606, the first layer 502 contacts a layer 502A (having an identical composition) at the hem 606. This minimizes the exposure of any of the dissimilar layers to an electrolyte that can result in the formation of a galvanic cell. This facilitates a minimization of corrosion. It is to be noted that the metals used in the hem for the metal layers 502, 506 and 510 can be selected from the lists of metals and alloys provided above.

In the embodiment depicted in the FIG. 4A, the first metal layer 506, the second metal layer 510 and the third metal layer 502 are first roll bonded to form a first laminate. An end portion 602 of the first laminate is then bent over (folder over) an existing portion of the first laminate and the folded portion may then be subjected to another compressive process in a compressive press or in another roll mill to form a hemmed portion 606 (See FIG. 4B).

Figure 5:
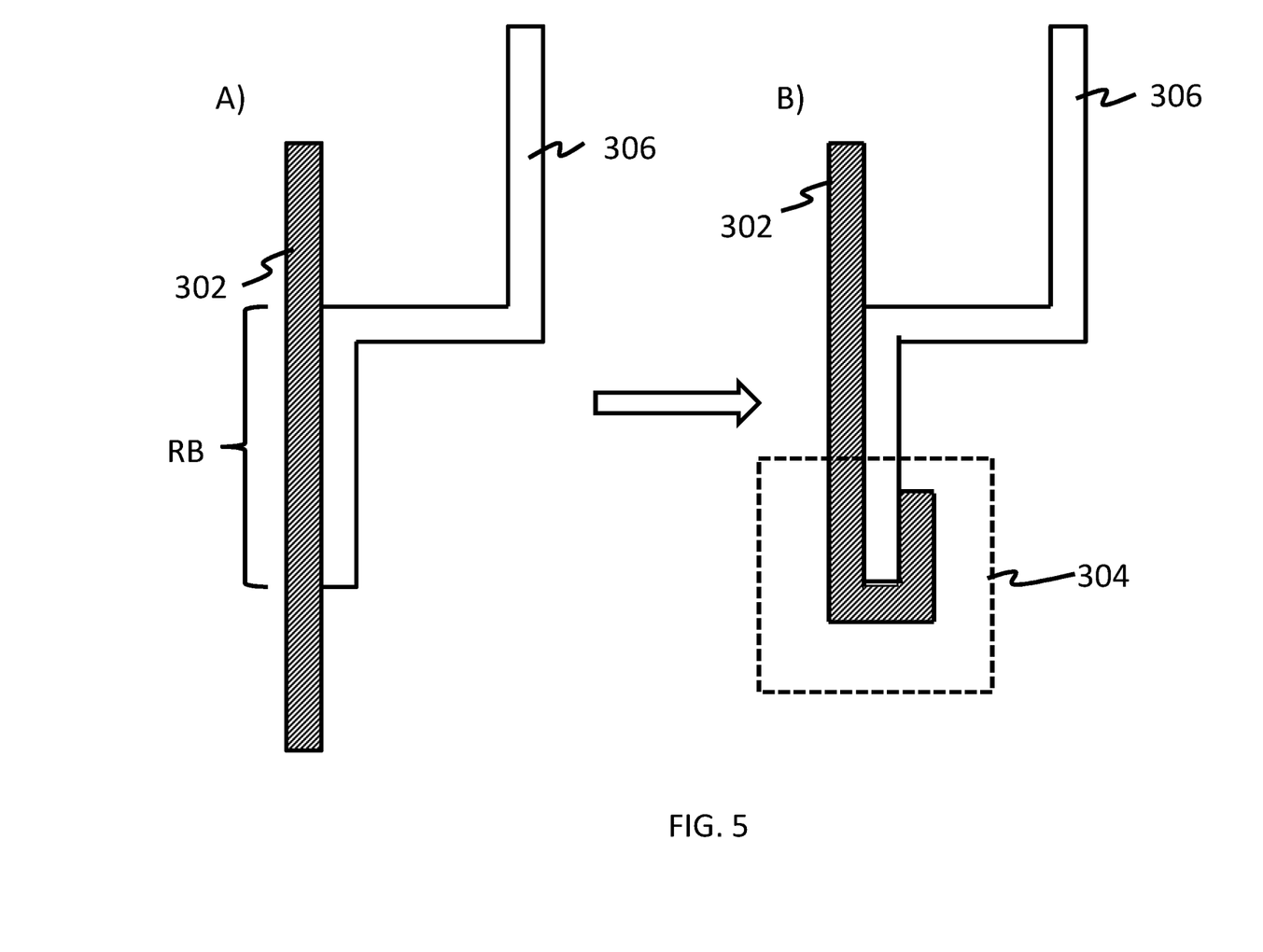
FIG. 5 depicts another exemplary method for hemming two dissimilar metals to form a joint.

The FIG. 5 depicts another exemplary method for hemming two dissimilar metals to form a laminate. The FIG. 5 depicts an exemplary automotive door comprising two different metals—a first metal layer 302 and a second metal layer 306 that are hemmed-in to form a joint. In step A of the FIG. 5, a portion of the first metal layer 302 and the second metal layer 306 are roll bonded together to form a laminate (see portion marked RB). The excess portion of the first metal layer 302 is then folded around the second metal layer 306 to form the joint (See Step B). After the "folding over", the hemmed portion shown in the dotted box 304 may be subjected to a second bimetallic joining process to improve the clamping of the second metal layer 306 by the first metal layer 302 if desired.

In an embodiment, the first metal layer 302 of the FIG. 5 comprises aluminum, while the second metal layer 306 comprises steel. In an embodiment, the article depicted in the FIG. 5 may be an automobile door with the first metal layer 302 having a Class A finish on an outer surface (an external surface).

Figure 6:
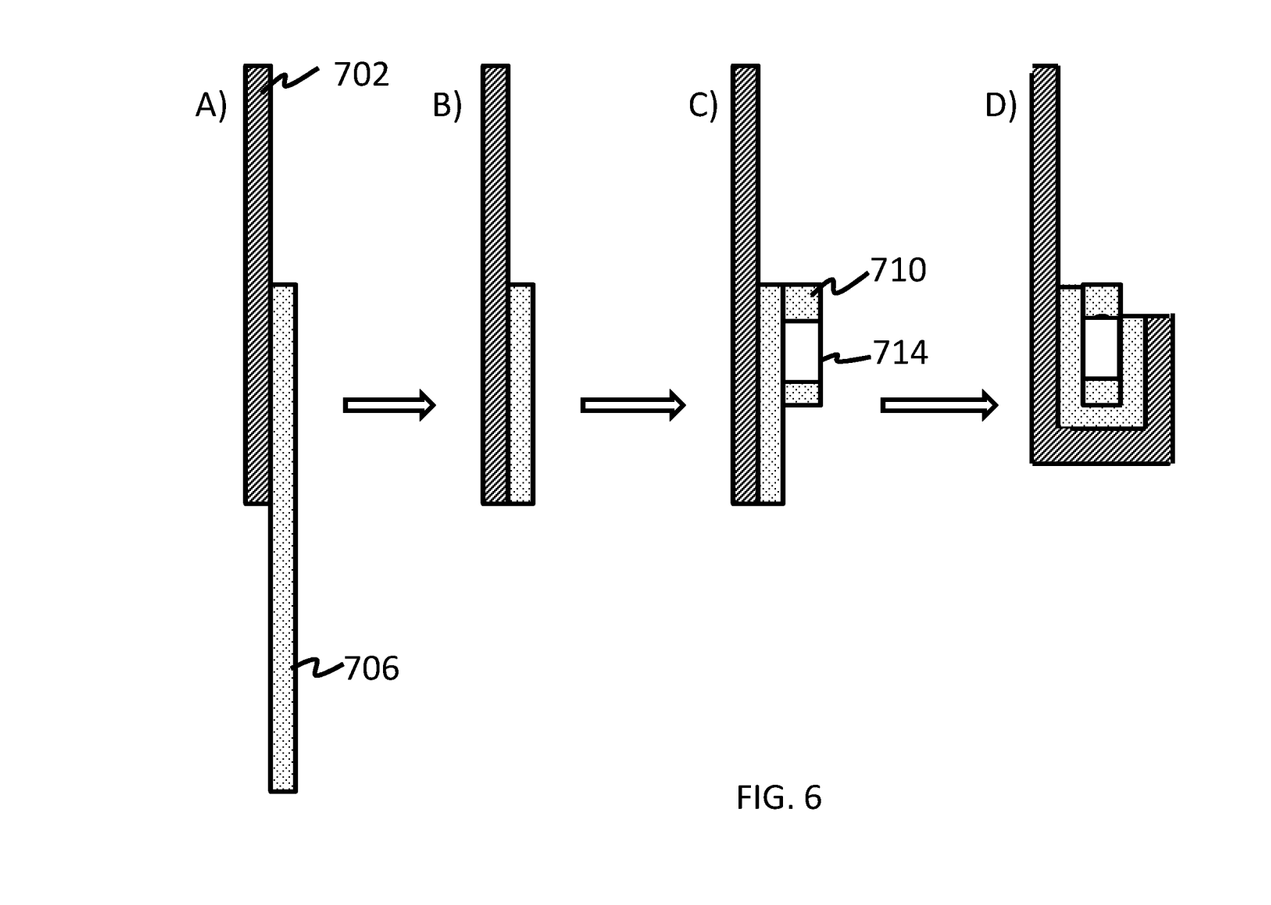
FIG. 6 depicts the manufacturing of a joint comprising two or more dissimilar metal layers that may be subjected to roll bonding followed by spot welding and hemming to form the joint.

In yet another embodiment, depicted in the FIG. 6, a joint comprising two or more dissimilar metal layers may be subjected to bimetallic joining followed by spot welding and hemming to form the joint. In the FIG. 6, a first metal layer 702 is bimetallically joined (e.g., via roll bonding) to a second metal layer 706 (See Step A) to form a first laminate. Excess undesirable metal from either the first or second metal layer may be removed (See Step B). A third layer 710 is with a clearance opening 714 is then welded onto the first laminate. The weld may be a puddle weld. Metal inert gas (MIG) welding, tungsten inert gas (TIG) welding or metal active gas (MAG) welding may also be used. MIG, TIG or MAG welding is a process in which an electric arc forms between a consumable wire electrode and the workpiece metal(s), which heats the workpiece metal(s), causing them to melt and join. The clearance opening 714 is used to MIG, TIG or MAG weld the third metal layer 710 to the second metal layer 702, following which a portion of the first laminate is folded over the third layer 710. The weld is encapsulated in the hem.

The resulting article thus has both the weld and the hem. In an embodiment, the first metal layer 702 comprises aluminum, while the second and the third metal layer 706 and 710 respectively comprise steel. Other metals listed above may also be used in the first and the second metal layer so long as they are dissimilar.

The methods and the articles disclosed herein are advantageous in that they result in reduced adhesive usage in a mixed material body, which greatly improves the vehicle radio frequency reception due to the presence of a consistent electrically conducting metal shell. It also results in the simplification of weld schedules. The method also results in design styling flexibility and packaging flexibility. Corrosion performance is also improved.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An article comprising:
   a first metal layer;
   a second metal layer that is chemically different from the first metal layer; where the first metal layer is steel and the second metal layer is aluminum; and
   a third metal layer disposed between the first metal layer and the second metal layer and contacting both the first metal layer and the second metal layer; where the third metal layer is chemically similar to either the first metal layer or the second metal layer; where at least two metal layers that are chemically similar are spot welded together through a clearance opening located in a metal layer that is not chemically similar to the at least two metal layers.

2. The article of claim 1, where the first metal layer, the second metal layer and the third metal layer are transition metals.

3. The article of claim 1, where a portion of at least two metal layers are folded over the third metal layer to form a hem.

4. A method for manufacturing a metal joint comprising:
   bonding a first metal layer to a second metal layer to form a first laminate; where the first metal layer and the second metal layer are chemically dissimilar materials; where the first metal layer is steel and the second metal layer is aluminum;
   contacting the first laminate with a third metal layer that is similar in composition to the first metal layer or the second metal layer; wherein the third metal layer is disposed between the first metal layer and the second metal layer and contacts both the first metal layer and the second metal layer; and
   welding together at least two metal layers that are chemically similar through a clearance opening located in a metal layer that is not chemically similar to the at least two metal layers.

5. The method of claim 4, where the bonding of the third metal layer to a metal layer in the first laminate comprises welding the third metal layer to a metal layer in the first laminate that has a composition similar to a composition of the third metal layer via an opening in a metal layer that has a different composition from the composition of the third metal layer.

6. The method of claim 4, where the welding comprises spot welding.

7. The method of claim 4, further comprising folding a portion of at least two metal layers over the third metal layer to form a hem.

8. The method of claim 4, where the third metal layer comprises steel.

9. The method of claim 4, where the third metal layer comprises aluminum.

10. The method of claim 4, where the bonding the first metal layer to the second metal layer to form a first laminate comprises roll bonding, magnetic pulse welding, or a combination thereof.

11. The method of claim 4, further comprising folding the first metal layer, the second metal layer and the third metal layer over to form a hem, where the second metal layer surrounds at least one surface of the first metal layer in the hem and where the third metal layer surrounds at least one surface of the second metal layer in the hem; and where frictional contact between a hemmed portion of the first metal layer, the second metal layer and the third metal layer keeps the first metal layer, the second metal layer and the third metal layer in contact with each other in the hem.

12. The method of claim 11, where contact between the second metal layer and the first laminate is brought about in a roll bonding process.

13. The method of claim 11, where contact between the first metal layer and the second metal layer is brought about via magnetic pulse welding.

* * * * *